United States Patent
Choi et al.

(10) Patent No.: US 11,094,945 B2
(45) Date of Patent: Aug. 17, 2021

(54) THERMAL BATTERY ELECTROLYTE MATERIALS

(71) Applicant: CFD Research Corporation, Huntsville, AL (US)

(72) Inventors: Pyoungho Choi, Huntsville, AL (US); Sameer Singhal, Huntsville, AL (US)

(73) Assignee: CFD Research Corporation, Huntsville, AL (US)

( * ) Notice: Subject to any disclaimer, the term of this patent is extended or adjusted under 35 U.S.C. 154(b) by 303 days.

(21) Appl. No.: 14/850,716

(22) Filed: Sep. 10, 2015

(65) Prior Publication Data
US 2016/0079608 A1    Mar. 17, 2016

Related U.S. Application Data (60) Provisional application No. 62/049,108, filed on Sep. 11, 2014, provisional application No. 62/049,110, filed on Sep. 11, 2014.

(51) Int. Cl.
*H01M 6/36* (2006.01)
*H01M 4/06* (2006.01)
(Continued)

(52) U.S. Cl.
CPC ............ *H01M 6/36* (2013.01); *H01M 4/06* (2013.01); *H01M 4/405* (2013.01); *H01M 4/582* (2013.01);
(Continued)

(58) Field of Classification Search
CPC .............. H01M 10/39; H01M 6/36; H01M 2300/0054; H01M 10/399
See application file for complete search history.

(56) References Cited

U.S. PATENT DOCUMENTS 3,338,749 A * 8/1967 Johnson ............... H01M 8/182
429/409
4,275,129 A * 6/1981 Kappus ............... H01M 10/399
429/112
(Continued)

FOREIGN PATENT DOCUMENTS

CN      102339979 A    2/2012

OTHER PUBLICATIONS

Tomczuk (Conference Proceedings: 163. Electrochemical Society meeting, San Francisco, CA, USA, May 8, 1983).*

*Primary Examiner* — Jeremiah R Smith
(74) *Attorney, Agent, or Firm* — Maschoff Brennan; Jonathan M. Benns (57) ABSTRACT

An electrolyte composition can be capable of becoming molten when heated sufficiently. The electrolyte can include at least one lithium halide salt; and at least one lithium non-halide salt combined with the at least one lithium halide salt so as to form an electrolyte composition capable of becoming molten when above a melting point about 350° C. A lithium halide salt includes a halide selected from F and Cl. A first lithium non-halide salt can be selected from the group consisting of $LiVO_3$, $Li_2SO_4$, $LiNO_3$, and $Li_2MoO_4$. A thermal battery can include the electrolyte composition, such as in the cathode, anode, and/or separator region therebetween. The battery can discharge electricity by having the electrolyte composition at a temperature so as to be a molten electrolyte.

20 Claims, 6 Drawing Sheets

(51) Int. Cl.
*H01M 4/58* (2010.01)
*H01M 4/40* (2006.01)
*H01M 10/39* (2006.01)

(52) U.S. Cl.
CPC .......... *H01M 4/5815* (2013.01); *H01M 10/39* (2013.01); *H01M 10/399* (2013.01); *H01M 2220/20* (2013.01); *H01M 2300/0054* (2013.01); *H01M 2300/0057* (2013.01); *H01M 2300/0062* (2013.01)

(56) References Cited

U.S. PATENT DOCUMENTS

| | | | |
|---|---|---|---|
| 5,895,730 A * | 4/1999 | Ritchie | H01M 10/399 429/103 |
| 8,394,520 B2 | 3/2013 | Swift et al. | |
| 8,440,342 B2 | 5/2013 | Swift et al. | |
| 8,652,674 B2 | 2/2014 | Swift et al. | |
| 2007/0105011 A1* | 5/2007 | Fujiwara | H01M 6/36 429/112 |
| 2011/0200864 A1 | 8/2011 | Dai | |
| 2011/0318624 A1* | 12/2011 | Swift | H01M 4/483 429/112 |
| 2013/0084474 A1* | 4/2013 | Mills | H01M 4/9016 429/9 |
| 2016/0290223 A1* | 10/2016 | Mills | C01B 3/00 |

* cited by examiner

THERMAL BATTERY ELECTROLYTE MATERIALS

CROSS-REFERENCE

This patent application claims priority to U.S. Provisional Application Nos. 62/049,108 and 62/049,110 both filed on Sep. 11, 2014, which both provisional applications are incorporated herein by specific reference in their entirety.

GOVERNMENT RIGHTS

This invention was made with government support under W31P4Q-11-C-0044 awarded by the U.S. Army. The government has certain rights in the invention.

BACKGROUND

Thermal batteries are used in many military applications that have the potential for an immediate or sudden demand for electric power. The thermal batteries have proven to be essential for providing power for radar and electronic guidance, and are able to operate in the high spin and setback environment of artillery shells, and operate in the high shock experienced in an earth-penetrator weapon. They can remain in weapon systems for 25 years or more over a wide range of storage (−55° C. to 75° C.) without degradation, and should be hermetically sealed as the moisture and air degrade the battery significantly.

Thermal batteries are operated at temperatures between 350-550° C. with molten salt electrolyte. They are inactive at room temperature as the molten salt electrolyte is in a solid state bearing a low ionic conductivity for minimizing self discharge and degradation processes. This low conductivity phase of the electrolyte promotes the capability for this type of battery to have very long shelf life with practically no capacity fade, and then can be activated within less than one second. For battery activation, internal pyrotechnics are ignited that generate thermal energy to raise the battery internal temperature to the melting temperature of the electrolyte, thereby causing a large increase in its ionic conductivity thus allowing the battery to operate. The battery is active as long as the electrolyte is above its melting point (e.g., typically above 350° C.) and generates power as long as enough active mass is available for the charge transfer reaction.

Previously, the most advanced common configurations of thermal batteries feature lithium-silicon alloy powder as anode material, $FeS_2$ as cathode material, and eutectic electrolyte such as LiCl—KCl or halide electrolyte mixture of LiCl—LiF—LiBr. The configurations operates at voltage less than 2 V and the capacity is limited, e.g., limited to 335 mAh/g for LiSi alloy-$FeS_2$ redox couple. These configurations cannot meet the requirements of new applications that are demanding high power and energy density. The principal avenue for increasing thermal battery specific energy is to identify and develop new chemistry and electrode materials, which provide high power with single cell voltages >2.5 V. The combination of higher specific capacity and higher operating voltage translates directly to higher power density at the battery level. The battery materials should be environmentally friendly, and potentially inexpensive in large scale production. As lithium alloyed with silicon or aluminum or tin provides high capacity as the anode, the power and capacity of thermal battery depend upon the cathode material.

Therefore, it would be advantageous to have improved thermal batteries that overcome the shortcomings of prior thermal batteries.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology is related to thermal batteries and the compositions and manufacturing thereof so as to have the potential to provide immediate electric power upon a sudden demand for electric power. The thermal batteries can have improved compositions at the cathode, anode, and/or electrolyte compositions in order to have the improved functionalities. The thermal batteries can be used in equipment to provide power and operate in the high spin and setback environment of artillery shells, and high shock experienced in an earth-penetrator weapon, or other similar uses.

The thermal batteries can be configured with the cathode, anode, and/or electrolyte compositions to be storage stable without degrading the electrical power potential. For example, the thermal batteries can be configured with the cathode, anode, and/or electrolyte composition to be capable of being storage stable for up to 25 years or more over a wide range of storage (−55° C. to 75° C.) without degradation. The thermal batteries can be hermetically sealed so that the cathode, anode, and/or electrolyte compositions are not exposed to external moisture. This can inhibit degradation of the battery.

The thermal batteries can include the cathode, anode, and/or electrolyte compositions being configured to operate at temperatures between 350-550° C. so that the electrolyte composition becomes a molten salt electrolyte. As such, the thermal batteries can be inactive at room temperature and up to 100, 200 or 300 or to 350° C. as the salt electrolyte is in a solid state and bearing a low ionic conductivity to minimizing self discharge and degradation processes. For example, the cathode, anode, and/or electrolyte compositions provide a low conductivity phase at low temperatures for the electrolyte that promotes the capability for this type of battery to have a long shelf life with practically no capacity fade and then can be activated within less than one second.

In one embodiment, the thermal batteries can include an ignition system that can increase the temperature to form molten electrolyte. For battery activation, the thermal battery can include internal pyrotechnics that can be ignited on a timer or on demand that generate thermal energy sufficient to raise the battery internal temperature to at least the melting temperature of the electrolyte, thereby causing a large increase in the electrolyte ionic conductivity in order to provide electricity. The thermal batteries can be configured to be active when the electrolyte is above the melting point (e.g., typically above 350° C.) and generate power as long as enough active mass is available for the charge transfer reaction.

The thermal batteries can be configured to provide high power and energy density. The cathode, anode, and/or electrolyte compositions can be configured to increase specific energy and provide high power. The cathode, anode, and/or electrolyte compositions provide a combination of higher specific capacity and higher operating voltage resulting in higher power density at the battery level. The cathode, anode, and/or electrolyte compositions battery materials can be considered to be environmentally friendly and can be recycled or disposed of after use.

In one embodiment, an electrolyte that is solid and/or stable at low temperatures and molten at high temperatures can include: at least one lithium halide salt; and at least one lithium non-halide salt, wherein the electrolyte includes a salt that has a melting point and can be molten above 350° C. In one aspect, a first lithium halide salt can include a halide selected from F and Cl. In one aspect, a first lithium non-halide salt includes a salt selected from the group consisting of $LiVO_3$, $Li_2SO_4$, $LiNO_3$, and $Li_2MoO_4$. In one aspect, the salt has a melting point between 350° C. and 600° C., wherein said first lithium halide salt includes LiF or LiCl, and said lithium non-halide salt includes at least one salt selected from the group consisting of $LiVO_3$, $Li_2SO_4$, $LiNO_3$, and $Li_2MoO_4$. In one aspect, the salt includes a first lithium halide salt and a second lithium halide salt, such as LiF and LiCl as lithium halide salts together. In one aspect, the lithium non-halide salt includes $LiVO_3$. In one aspect, the lithium non-halide salt includes $Li_2MoO_4$. In one aspect, the lithium non-halide salt includes $Li_2SO_4$. In one aspect, the lithium non-halide salt includes $LiNO_3$. In one aspect, the electrolyte can include only lithium as a positive ion. In one aspect, the electrolyte is at a temperature of between 350° C. and 600° C. and is molten. In one aspect, the amount of halide anion relative to a total amount of negative ions is at least about 20 mol %. In one aspect, the first lithium halide salt and second lithium halide salt have a ratio of from about 0.1 to about 1.0. In one aspect, the total lithium halide salt and total lithium non-halide salt has a ratio of from about 0.2 to about 2.0. In one aspect, the lithium halide salt being devoid of I or Br.

In one embodiment, a thermal battery can include electrolyte that is solid and/or stable at a low temperature (e.g., less than 350° C.) and molten at the higher temperature (e.g., greater than 350° C.). The thermal battery can include an anode; a cathode; and a separator having the potentially molten electrolyte. In one aspect, the cathode includes the potentially molten electrolyte therein. In one aspect, the separator has an inorganic binder. In one aspect, the anode includes the potentially molten electrolyte therein.

In one embodiment, a method of making a molten electrolyte can include: mixing at least one lithium halide salt with at least one lithium non-halide salt. In one aspect, such mixing can result in a potentially molten salt that is molten at 350° C. or above. The method can include combining a binder with the potentially molten electrolyte.

In one embodiment, a method of providing electricity can include: providing an electronic device having a thermal battery with a potentially molten electrolyte of one of the embodiments; increasing temperature to at least 350° C.; and discharging the thermal battery to provide electricity.

In one embodiment, a thermal battery can include: an anode of lithium alloy; a potentially molten salt electrolyte that is solid and/or stable at a low temperature (e.g., less than 350° C.) and molten at the higher temperature (e.g., greater than 350° C.); and a metal-fluoride cathode. In one aspect, the lithium alloy is lithium silicon or lithium aluminum. In one aspect, the anode material can include 10%-50% electrolyte material. In one aspect, the metal of the metal fluoride cathode can include Fe, V, Cr, Mn, Co, or mixture thereof. In one aspect, the metal-fluoride cathode can include $FeF_3$, or $VF_3$, or $CrF_3$, or $MnF_3$, or $CoF_3$, or a mixture thereof. In one aspect, the cathode material can include an amount of the electrolyte. In one aspect, the cathode material can include at least 65 wt % the metal-fluoride and at least 1 wt % carbon material. In one aspect, the cathode material can include 10%-50% electrolyte material. In one aspect, the metal-fluoride cathode can include a carbon material therein. In one aspect, the carbon material can be activated carbon, graphite, graphene, carbon nanotube, and combinations thereof.

In one embodiment, a thermal battery cathode can include $FeF_3$ or any other material described herein, such as a hybrid material of $FeF_3/FeS_2$, $CoF_3/CoS_2$, and/or $CoF_3/FeS_2$. The cathode can further include a carbon material, such as activated carbon, graphite, graphene, carbon nanotubes (CNT), or combinations thereof. In one aspect, the cathode can have about 0% to about 25% CNT and from about 75% to about 100% $FeF_3$ or $FeF_3/FeS_2$, $CoF_3/CoS_2$, and/or $CoF_3/FeS_2$ or other material such as a hybrid material, or any percentage within the percentage range. In one aspect, the cathode can have about 5% CNT and about 95% $FeF_3$ or other material such as a hybrid material. In one aspect, the cathode can have a dimension from about 0.1 mm to about 1.0 mm thick. In one aspect, the cathode can include a dimension from about 0.8 to about 0.1 mm thick. In one aspect, the cathode can have a dimension of 0.5 mm.

In one embodiment, a method of making the thermal battery having a metal fluoride cathode can include combining the metal fluoride cathode into a thermal battery. A method of making the metal fluoride cathode can include preparing the thermal cathode.

In one embodiment, a thermal battery cathode can include a metal fluoride selected from one or more of $FeF_3$, or $VF_3$, or $CrF_3$, or $MnF_3$, or $CoF_3$, or a mixture thereof, or any alone or in any combination.

In one embodiment, a method of providing electricity can include providing an electronic device having a thermal battery with a metal fluoride cathode; and discharging the thermal battery to provide electricity.

Figure 4:
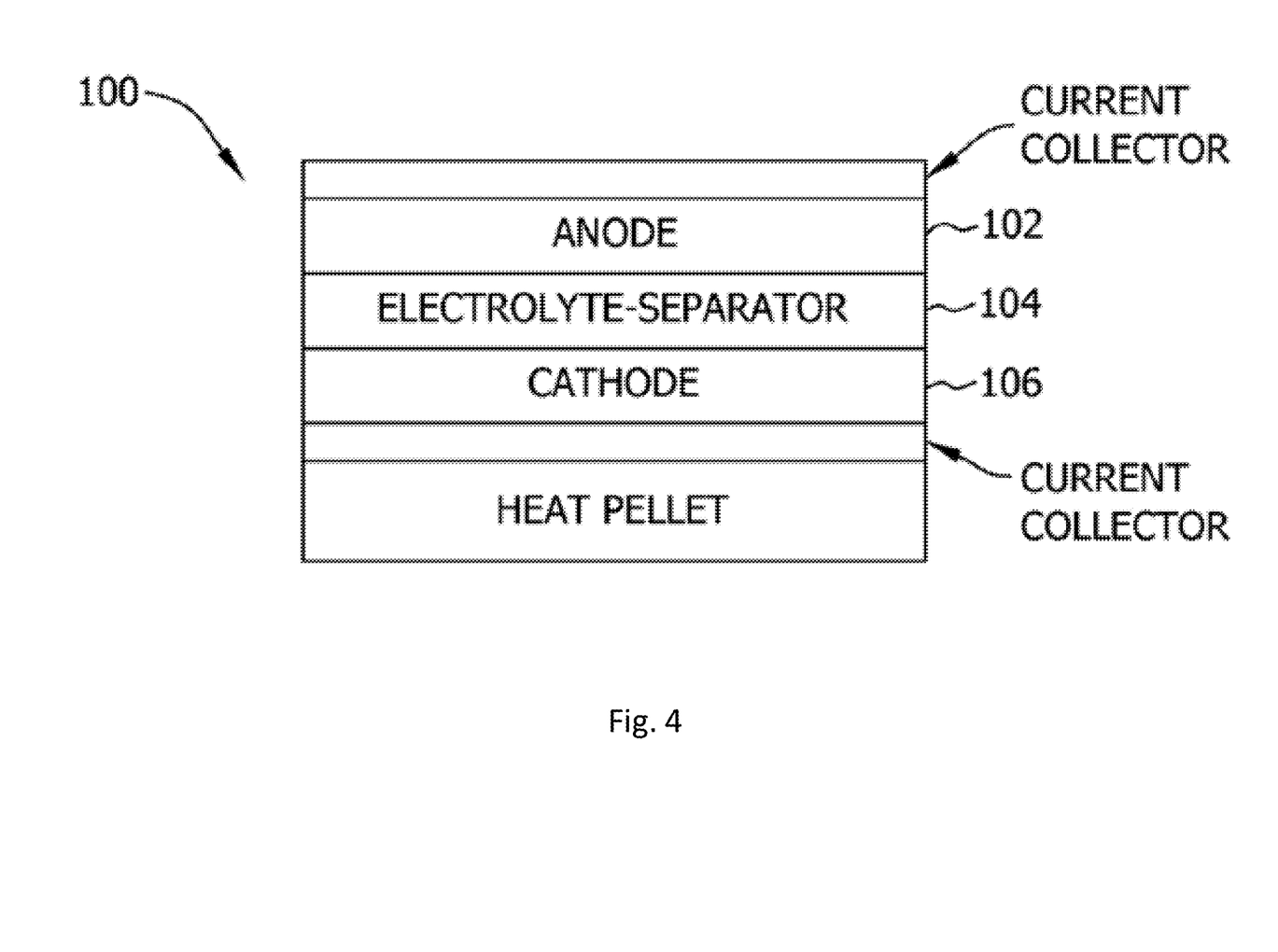
FIG. 4 shows an embodiment of a thermal battery.

FIG. 4 shows an embodiment of a thermal battery 100 that includes a heat pellet, a current collector above the heat pellet, a cathode region 106 above the current collector, an electrolyte separator region 104 above the cathode region, an anode region 102 above the electrolyte separator region 104, and a second current collector above the anode region 102.

In one embodiment, the anode can be a lithium alloyed with silicon or aluminum or tin to provide high capacity as the anode. Corresponding the power and capacity of the thermal battery can be improved by providing the cathode material described herein with the electrolyte.

In one embodiment, the present technology includes a thermal battery with a lithium silicon anode, a molten salt electrolyte, and a fluorine-based cathode. In particular, the thermal battery can include a fluorine-based cathode material that generates higher energy and power densities than conventional thermal batteries.

The thermal batteries can be configured to produce high power and energy density thermal batteries with fluorine-based cathode. The thermal battery employing the fluorine-based cathode materials can improve the power density by more than three times compared to the conventional ones. A fluorine-based cathode of the present technology includes metal fluorides such as $VF_3$, $CrF_3$, $MnF_3$, $FeF_3$, and $CoF_3$ (see the Tables). In a preferred embodiment of the present technology, electrical conducting materials are incorporated into the fluorine-based cathode materials.

In one embodiment, a thermal battery can include a lithium alloy anode, lithium alloy eutectic electrolyte, and a metal fluoride cathode. It may include an electrical conductor incorporated into the active component. The electrical conductor can be selected from the carbon-containing materials, such as activated carbon, graphite, and graphene, carbon nanotubes (CNT) or the like, such as any high surface area carbons.

Figure 1:
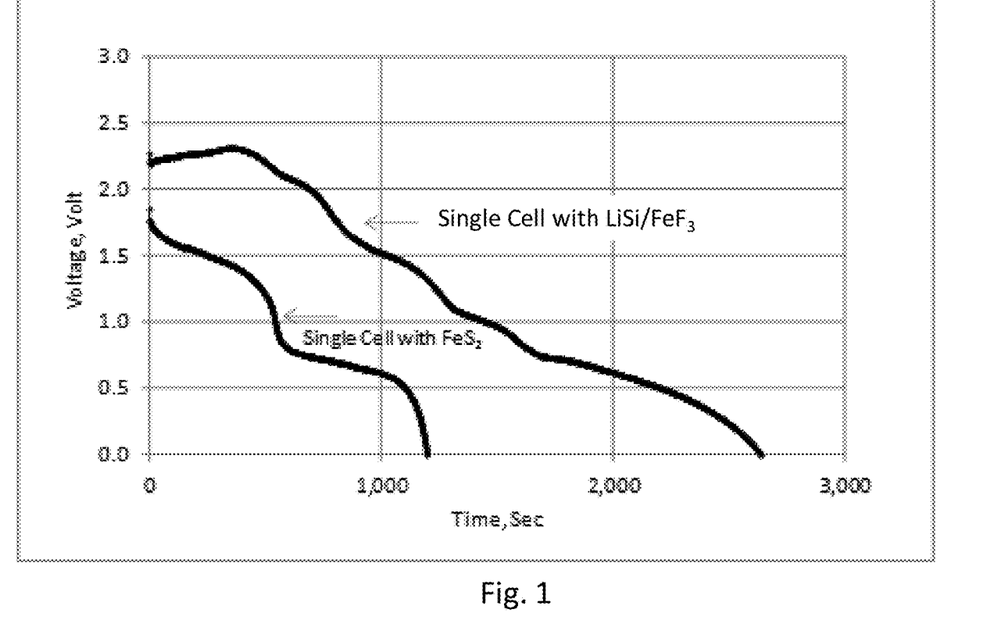
FIG. 1 includes a graph that shows the voltage versus time for different cathode materials.

It has been demonstrated that the thermal battery with the fluorine cathode materials showed improved performance. FIG. 1 shows discharge characteristics of a thermal battery with a LiSi/$FeF_3$ couple compared to one with a LiSi/$FeS_2$ couple. The LiSi/$FeF_3$ thermal battery showed OCV (i.e., open circuit voltage) of 3.3 V, while LiSi/$FeS_2$ showed OCV of only 2.2 V.

In one embodiment, the electrolyte can be a lithium halide. The stability order of lithium halides is more preferred LiF>LiCl>LiBr>LiI to less preferred. However, molten salt electrolyte containing LiBr or LiI cannot be used for high voltage (>3.5 V) thermal battery operating at 500° C., and thereby can be used at lower temperature applications, such as under 50° C. or 40° C. The LiF lithium halides may be used at any temperature range, such as above 400° C. or above 500° C. On the other hand, molten salt containing chlorine ion (e.g., LiCl) may not be desirable as it is decomposed at 3.5 V.

In one embodiment, a battery can include: an anode of lithium alloy; a molten salt electrolyte; and a metal fluoride cathode. In one aspect, the battery can be a thermal battery. In one aspect, the lithium alloy is lithium silicon or lithium aluminum. In one aspect, the anode region may include 10%-50% electrolyte material. In one aspect, the molten salt can include at least 20 wt % lithium fluoride and at least 40 wt % lithium chloride. In one aspect, the cathode material can include $FeF_3$, or $VF_3$, or $CrF_3$, or $MnF_3$, or $CoF_3$, or a mixture of them. In one aspect, the cathode material includes any amount of the electrolyte. In one aspect, the cathode material includes at least 65 wt % of the fluorine cathode material and at least 1 wt % carbon material. In one aspect, the cathode region comprises 10%-50% electrolyte material. In one aspect, the carbon material is activated carbon, graphite, graphene, carbon nanotube, and the like.

The fluorine materials described herein can be used for high voltage cathode materials in thermal batteries. The cathode material can have a working cell voltage that is greater than 30% of the traditional (e.g., $FeS_2$) thermal battery cathode technology. This increased cell voltage can allow for battery designs (e.g., battery housing) to become 20% to 30% shorter in length. For example, in a high voltage 160 volt battery design, a battery using standard thermal battery technology would require approximately 84 cells a high voltage 160 volt battery design. Using cathode material described herein, only 64 cells would be needed for a high voltage 160 volt battery design. The shorter length for the battery designs can result in lower costs since there will be less material (fewer cells) required per battery. The shorter battery length can also reduce the amount of battery mass and volume to fit in smaller spaces in devices or equipment.

Congruently, this technology can also be very beneficial for increasing a battery design's operating life within the same fit form factor as the current design. Specifically, the room allotted to the now needless cells could be taken up by thicker cells resulting in an increase to the overall capacity of the battery design. Current production programs that require block upgrades can benefit since more aggressive mission times could be met while still maintaining the original fit form factor. Future space/kill vehicle applications can benefit from the ability to reduce the overall weight and volume of the power source.

In one aspect, the metal halide cathode can be combined with a molten salt electrolyte stable up to 3.5 V, such as a lithium halide. The electrolyte provides two main functions: (1) maintain electrochemical stability for high voltage operation (>2.5 V) and (2) effectively conducts lithium ions from the anode to the cathode. The thermal battery can include lithium-metal halide redox chemistry between the cathode and molten salt electrolyte, which results in a high capacity cathode for thermal battery that can generate high voltage (OCV>3 V) and as a result high power and energy density.

The thermal battery can include metal halide composites that can produce high cell voltage (>3.0 V) when coupled with a lithium alloy anode. The cell voltage may be increased to >3.5 V by optimization. The thermal battery described herein can operate at more than 2.5 V with current density of 0.1-1 A/$cm^2$.

The thermal battery can include a molten salt electrolyte layer sandwiched between high capacity anode and cathode. The lithium alloy anode is oxidized during the discharge process as:

$$M_xLi \rightarrow M_x + Li^+ + e^-  \quad [1]$$

Where Mx is a metal alloyed with lithium, such as Sn or Si. Lithium ion Li+ diffuses through the molten salt electrolyte and reaches the cathode where it combines with the electron at the interface by the following reaction:

$$M_aF_b + Li^+ + e^- \rightarrow LiM_aF_b \quad [2]$$

Where M can be V, Cr, Mn, Fe, Co, Ni, and Cu, as they can generate high discharge capacity. These cathodes can generate >3.0 V open circuit potential at the operating temperature of thermal battery. The a and b in Equation 2 can vary according to the chemical structures.

For anode materials, high capacity lithium-based materials are beneficial. Lithium metal can provide the highest capacity. Lithium alloyed with silicon and tin are qualified due to their high theoretical energy densities ~4200 mAh/g and 994 mAh/g corresponding to the binary alloys $Li_{22}Si_5$ and $Li_{22}Sn_5$. $Li_{22}Si_5$ (or $Li_{4.4}Si$) is a good candidate for the anode as it produces highest emf (44 mV vs Li) among the alloys. $Li_{13}Si_{14}$ can be used as the anode. Discharge states for the anode are:

$$Li_{22}Si_4 \rightarrow Li_{13}Si_{14} \rightarrow Li_7Si_3 \rightarrow Li_{12}Si_7 \quad [3]$$

The particle size of lithium alloy can be reduced by high energy ball milling. The technology includes particle size control, optimum anode composition (electrode and electrolyte), and pellet size and its thickness optimization.

Molten salt composed of metal halide and sulfate, such as LiF—NaF—KF, LiF—LiCl—$Li_2SO_4$ and/or LiF—$Li_2SO_4$, can be used in the high voltage cathode region. Their melting point is relatively high (>400° C.) and stable at high voltage.

Molten nitrates have much lower melting point than molten halides and their conductivities are comparable to those of halides. For example, $LiNO_3$—$NaNO_3$ (56-44, mol %) melts at 187° C. and ionic conductivity is 1.14 S/cm at 327° C. The ionic conductivities of LiCl—KCl and LiF—LiCl—LiBr are 1.69 and 3.21 S/cm at 475° C., respectively. The nitrate-based electrolyte may be used effectively for the thermal battery at much lower temperature (Table 1).

During the discharge process, the nitrate is reduced to oxide and nitrite as:

$$2Li^+ + LiNO_3 + 3e^- \rightarrow LiNO_2 + Li_2O(s) \quad [4]$$

The insoluble $Li_2O$ film prevents the nitrates from further reduction and allows the electrochemical window of 4.5 V for molten $LiNO_3$ at 300° C. and $LiNO_3$—$KNO_3$ eutectic. The $Li_2O$ film protects the lithium anode by forming the interface in the oxidizing nitrate electrolytes. The presence of Cl-ions in the thermal battery components can be excluded in one aspect because the ion can breakdown the protective $Li_2O$ film during the discharge process:

$$Li_2O_{(a)} + Cl^- \rightarrow 2Li + OCl^- \quad [5]$$

High concentration of lithium ions can be helpful for highly conductive electrolyte. Nitrate melts that do not contain $LiNO_3$ as a major component, such as $NaNO_3$—$KNO_3$ melts, may not be as beneficial for lithium-based anodes, and thereby can be excluded. High stability of the protective $Li_2O$ film can be achieved by increasing the $LiNO_3$ component of the molten salt.

TABLE 1

Proposed Molten Salt Electrolytes for High Capacity Cathodes

| Electrolyte | Composition (mol %) | M.P. (° C.) |
|---|---|---|
| LiCl—KCl | 58.8-41.2 | 352-354 |
| LiF—LiCl—LiBr | 22-31-47 | 430-444 |
| LiF—NaF—KF | 46.5-11.5-42 | 455 |
| LiF—$Li_2SO_4$ | 41-59 | 530 |
| LiCl—$Li_2SO_4$ | 60.5-39.5 | 485 |
| MiNO3—KNO3—CsNO3 | 37-39-24 | 97 |
| $LiNO_3$—$LiNO_2$ | 40-60 | 108 |
| LiNO3—NaNO3—KNO3 | 37.5-18-44.5 | 120 |
| $LiNO_3$—$KNO_3$ | 42-58 | 124 |
| $LiNO_3$—$LiNO_2$ | 30-70 | 147 |
| LiNO3—RbNO3 | 30-70 | 148 |
| LiNO3—CsNO3 | 57-43 | 174 |
| $LiNO_3$—$NaNO_3$ | 56-44 | 187 |
| $NaNO_3$—$KNO_3$ | 46-54 | 222 |

The molten nitrate electrolytes are compatible with high-voltage cathode materials. The use of nitrate salts as a lower melting electrolyte may shorten thermal battery's activation time and reduces the weight of heat sources and insulation. Among the nitrates, $LiNO_3$—$KNO_3$ and $LiNO_3$—$NaNO_3$ are expected to generate high discharge current at high voltage (>3.0 V).

The cathode with the combinations described herein (e.g., LiSi/$FeF_3$) can provide higher capacity than the current state of the art cathodes. As seen in FIG. 1, energy density with LiSi/$FeF_3$ was increased by 3.3 times at 1 V cutoff compared to the conventional cell with $FeS_2$ and LiF—LiCl—LiBr. Accordingly, the thermal batteries can be devoid of the electrolyte being LiF—LiCl—LiBr because of a lack of stability at voltages higher than 3V.

A high voltage (>3 V) lithium sulfate electrolyte can provide cell with the cathode and electrolyte shows discharge voltage more than 2.2 V at 100 mA/cm². It has been found that performance of the cell can depend on cathode, ball milling time, and additives to the cathode. Also, the performance of the thermal battery may be improved further through the optimization of the electrode and electrolyte and their processing conditions.

Nanoscale particles can be used for efficient utilization of the active electrode materials and ionic and electron conductive additives can be incorporated into the cathode to further enhance the discharge characteristics at high rate.

Figure 2:
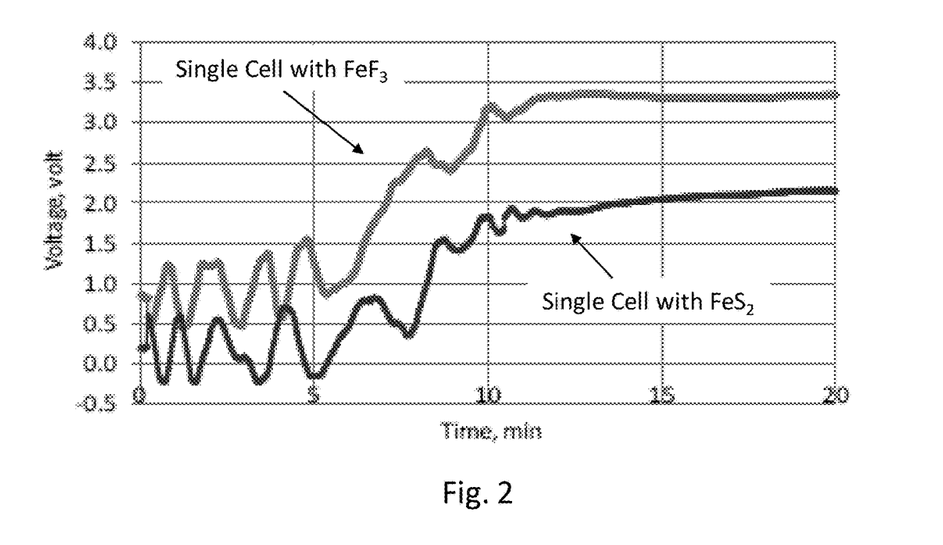
FIG. 2 includes a graph that shows the experimental open circuit voltage (OCV) results of the LiSi—$FeF_3$ couple compared to the conventional couple of LiSi—$FeS_2$.

In one embodiment, a cathode can include a LiSi—$FeF_3$ couple or other LiSi-metal-fluoride couple. FIG. 2 shows the experimental open circuit voltage (OCV) results of the LiSi—$FeF_3$ couple compared to the conventional couple of LiSi—$FeS_2$. The LiSi—$FeF_3$ couple generated higher potential (e.g., 3.4 V vs. lower 2.2 V with LiSi—$FeS_2$) and can produce high energy density (712 mAh/g vs. present 335 mAh/g with LiSi—$FeS_2$) at 1 V cutoff. Thus, FIG. 2 shows the open circuit voltage during activation: Top line (lighter) $FeF_3$, Bottom line (darker) $FeS_2$. Fluorine-based cathode material such as $FeF_3$ is coupled with LiSi anode to generate high voltage thermal battery; it demonstrates open-circuit voltage of 3.3 V with operating cell voltage more than 2.5 V at 100 mA/cm² current density. FIG. 2 shows a 50% improvement in OCV with LiSi—$FeF_3$ compared to LiSi—$FeS_2$. Table 2 shows the open current voltage from some embodiments.

TABLE 2

Capacity of Proposed Cathodes

| Cathode | Chemistry | Capacity, $V_{cutoff}$ = 1 V | OCV at 500 C. |
|---|---|---|---|
| $FeS_2$ | $FeS_2 + 3/2Li^+ + 3/2e^- \rightarrow 1/2Li_3Fe_2S_4$ | 1206 A · s/g (1.5Li/$FeS_2$) | 2.2 V |
| $CoS_2$ | $FeS_2 + 4/3e^- \rightarrow 1/3Co_3S_4 + 2/3S^{2-}$ | 1045 A · s/g (1.5Li/$FeS_2$) | 2.2 V |

TABLE 2-continued

Capacity of Proposed Cathodes

| Cathode | Chemistry | Capacity, $V_{cutoff}$ = 1 V | OCV at 500 C. |
|---|---|---|---|
| FeF$_3$ | FeF$_3$ + 3Li$^+$ + 3e− → Fe + 3LiF | 2565 A · s/g (3Li/FeS$_2$) | 3.4 V |
| CoF$_3$ | CoF$_3$ + 3Li$^+$ + 3e− → Co + 3CoF | 2496 A · s/g (3Li/FeS$_2$) | 3.4 V |

In one embodiment, various of the described molten salt electrolytes can be for use in thermal batteries. In particular, ternary or quaternary electrolyte material that is electrochemically stable at high voltage (>3 V) can be used.

The molten salts described herein are solid at normal temperature, where the electrolyte has no ion conductivity and therefore thermal battery is not active. However, when the electrolyte is heated to high temperature, the electrolyte achieves a molten state, becoming an excellent ion-conductor. Thus, thermal battery becomes active under high temperature.

In one aspect, the present thermal battery can include an electrolyte composition having two or three or more salts. In one aspect, the salts can contain lithium only as the positive ion, and in this aspect no other positive ions except lithium are included. The lithium salts can include two types of negative ions; one is halide, and the other is non-halide. In one aspect, the salts with halide negative ion are F— and Cl—. In one aspect, the non-halide negative ions include vanadate, sulfate, nitrate, and molybdate. In a preferred embodiment of present invention, the electrolyte has one or more salt with halide and one or more with non-halide.

The thermal battery can also include a separator composition having the electrolyte and an inorganic binder. Examples of the inorganic binder can include magnesium oxide, silica, and zirconia.

Also, the electrode regions can be configured to have the ability to contact or contain the electrolyte for use in thermal batteries.

Figure 3:
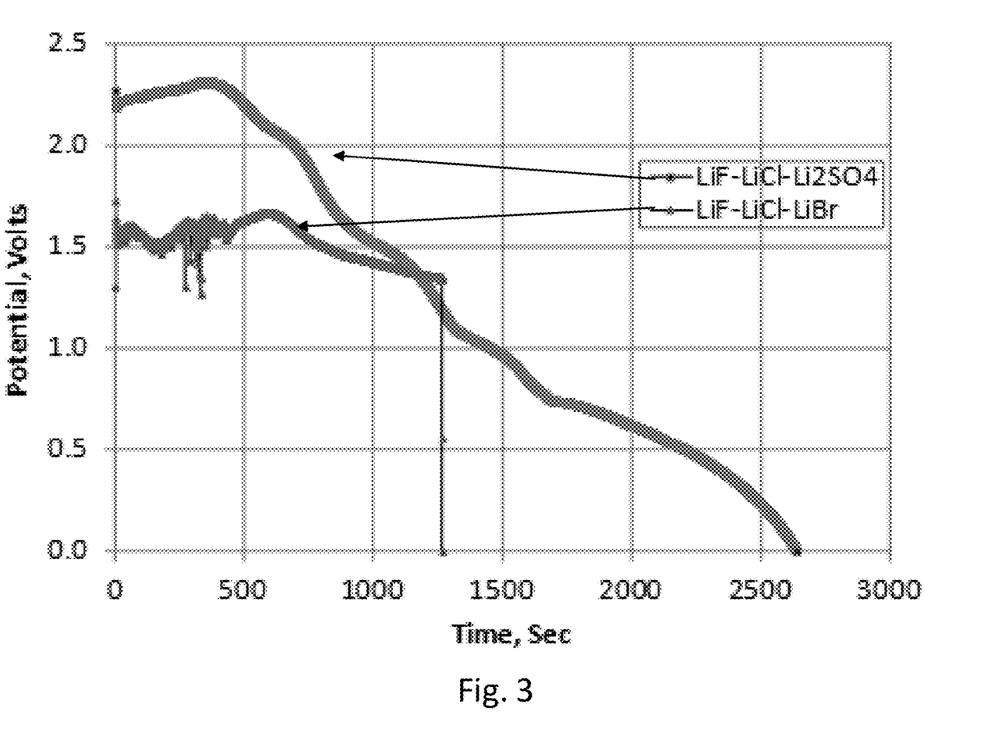
FIG. 3 includes a graph that shows discharge characteristics of a thermal battery with LiSi/$FeF_3$ couple employing LiF—LiCl—$Li_2SO_4$ compared to one with the conventional LiF—LiCl—LiBr electrolyte (Top: LiF—LiCl—$Li_2SO_4$; Bottom: LiF—LiCl—LiBr).

FIG. 3 shows discharge characteristics of a thermal battery with LiSi/FeF$_3$ couple employing LiF—LiCl—Li$_2$SO$_4$ compared to one with the conventional LiF—LiCl—LiBr electrolyte (Top: LiF—LiCl—Li$_2$SO$_4$; Bottom: LiF—LiCl—LiBr). The thermal battery with the new LiF—LiCl—Li$_2$SO$_4$ showed high voltage and stable voltage traces, while the thermal battery with LiF—LiCl—LiBr electrolyte showed low voltage and unstable discharge characteristics. LiF—LiCl—LiBr electrolyte in the high voltage electrode may react with the electrodes, or dissolve the electrode, or decomposes at high voltage (>3V) due to Br– ions in the electrolyte. The new electrolyte can easily be synthesized by melting process of individual components.

In one aspect, a molten salt includes two types of salt; a first lithium salt and a second lithium salt, said molten salt having a melting point between 350° C. and 600° C., wherein said first salt includes LiF, LiCl, and said second salt includes at least one salt selected from the group consisting of LiVO$_3$, Li$_2$SO$_4$, Li$_2$MoO$_4$. In one aspect, the positive ion is lithium only. In one aspect, an amount of halide anion relative to a total amount of negative ions included in said molten salt is 20 mol % or more.

A thermal battery can include at least one unit cell including a positive electrode, a negative electrode, and an electrolyte disposed between said positive electrode and said negative electrode, wherein said electrolyte includes the molten salt in accordance with the disclosure herein. In one aspect, at least one of said positive electrode and said negative electrode further includes said molten salt.

The battery can include a stack of 2 cells to about 500, more preferably from about 4 cells to about 250 cells, and most preferably from about 8 cells to about 200 cells.

The battery can include an anode having a thickness of about 0.01 mm to about 2 mm, more preferably from about 0.05 mm to about 1.5 mm, and most preferably from about 0.1 mm to about 1.0 mm.

The battery can include a cathode having a thickness of about 0.01 mm to about 2 mm, more preferably from about 0.05 mm to about 1.5 mm, and most preferably from about 0.1 mm to about 1.0 mm.

The battery can include an electrolyte separator region thickness of about 0.01 mm to about 2 mm, more preferably from about 0.05 mm to about 1.5 mm, and most preferably from about 0.1 mm to about 1.0 mm.

The present disclosure provides improved electrolyte material for use in thermal batteries including the cathodes and anodes thereof. The ways in which the improved electrolyte, cathode, anode, and battery overcome the shortcomings of the prior art are discussed in more detail below.

One aspect of the present disclosure is directed to an electrolyte material for use in thermal batteries, in one optional aspect the electrolyte material being substantially binder-free. Examples of binders that can be excluded can include yttrium oxide.

The electrolyte material can include at least about 20 wt % lithium fluoride, at least about 20 wt % lithium chloride, and at least about 25 wt % Li$_2$SO$_4$. In one aspect, the material includes from about 10 to about 20 wt % lithium fluoride, from about 5 to about 20 wt % lithium chloride, and from 10 to about 30 wt % Li$_2$SO$_4$.

The electrolyte material includes at least about 20 wt % first lithium halide, at least about 10 wt % second lithium halide, and at least about 20 wt % lithium non-halide. In one aspect, the material includes from about 10 to about 30 wt % first lithium halide, from about 10 to about 30 wt % second lithium halide, and from 10 about to about 30 wt % lithium non-halide.

The electrolyte material includes at least about 10 wt % lithium fluoride, at least about 10 wt % lithium chloride, and at least about 20 wt % Li$_2$SO$_4$. In one aspect, the material includes from about 10 to about 20 wt % lithium fluoride, from about 10 to about 20 wt % lithium chloride, and from about 10 to about 30 wt % Li$_2$SO$_4$.

The electrolyte material includes at least about 5 wt % first lithium halide, at least about 5 wt % second lithium halide, and at least about 5 wt % lithium non-halide. In one aspect, the material includes from about 5 to about 10 wt % first lithium halide, from about 5 to about 10 wt % second lithium halide, and from about 5 to about 10 wt % lithium non-halide.

The electrolyte material includes at least about 5 wt % lithium fluoride, at least about 10 wt % lithium chloride, and at least about 20 wt % Li$_2$SO$_4$. In one aspect, the material includes from about 3 to about 30 wt % lithium fluoride, from about 3 to about 30 wt % lithium chloride, and from about 3 to about 30 wt % Li$_2$SO$_4$.

The electrolyte material includes at least about 5 wt % first lithium halide, at least about 5 wt % second lithium halide, and at least about 10 wt % lithium non-halide. In one aspect, the material includes from about 5 to about 10 wt % first lithium halide, from about 5 to about 10 wt % second lithium halide, and from about 5 to about 10 wt % lithium non-halide.

In a specific example, the electrolyte material includes about 5 wt % first lithium halide, about 5 wt % second lithium halide, and about 10 wt % lithium non-halide. In one example, the electrolyte material includes at least about 3 wt % lithium halide, and at least about 3 wt % lithium non-halide. In one aspect, the material includes from about 3 to about 10 wt % lithium halide, and from about 3 to about 10 wt % lithium non-halide.

In one example, the cathode material includes at least about 3 wt % metal fluoride, and at least about 0.1 wt % high surface area carbon. In one aspect, the material includes from about 2 to about wt 5% metal fluoride, and from about 0.001 to about 1 wt % high surface area carbon. In one example, the cathode material includes at least about 10 wt % metal fluoride, and at least about 3 wt % high surface area carbon. In one aspect, the material includes from about to about 20 wt % metal fluoride, and from about 1 to about 10 wt % high surface area carbon. In one example, the cathode material includes at least about 20 wt % metal fluoride, and at least about 1 wt % high surface area carbon. In one aspect, the material includes from about 30 to about 10 wt % metal fluoride, and from about 0.5 to about 3 wt % high surface area carbon.

The electrolyte may contain three or four salts such as those described herein. The lithium sulfate in the recited amounts can be substituted with a similar amount of a different lithium non-halide salt, such as those described herein.

With the new metal fluoride cathode, the inventors determined a problem with the previous electrolytes breaking down due to the enhanced performance. Now, the inventors have identified the lithium halide and lithium non-halide electrolyte (e.g., binary with only one lithium halide or tertiary with two different lithium halides) to handle the voltage without breaking down. If binary, it can be preferably LiCl or LiF, or using both when tertiary.

Figure 5:
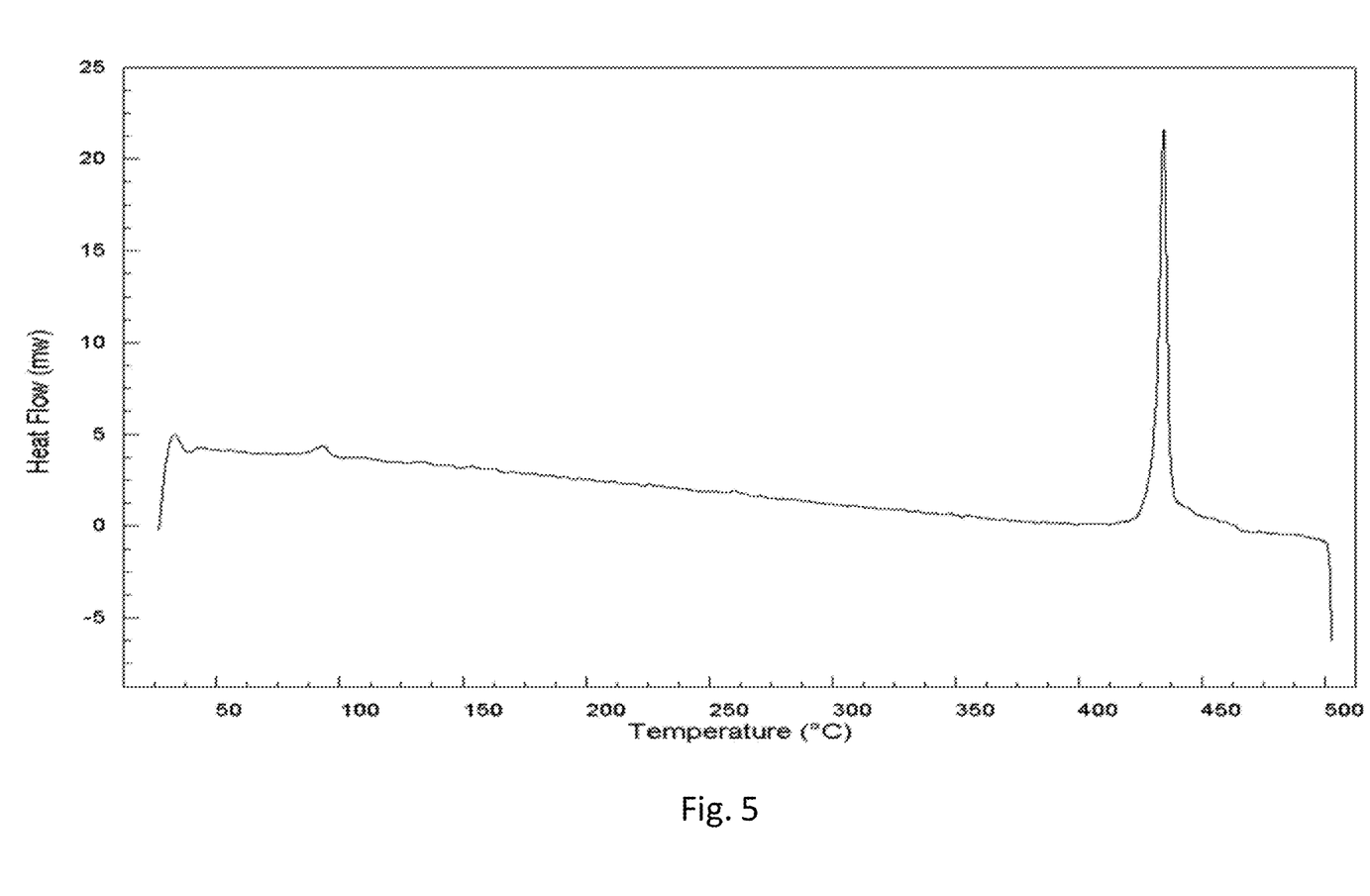
FIG. 5 includes a graph that shows the heat flow (mw) versus temperature in DSC for LiF—LiCl—$Li_2SO_4$ with 35-48-17.

In one example, the electrolyte can be LiF—LiCl—$Li_2SO_4$ approximate weight percentages. FIG. 5 shows the heat flow (mw) versus temperature in DSC for LiF—LiCl—$Li_2SO_4$ with 35-48-17. The composition of the electrolyte can change the viscosity and melting temperature. Some non-limiting examples of LiF—LiCl—$Li_2SO_4$ can include the following ratios: 25-48-27; 30-48-22; 35-48-17; or 40-48-12, or approximate weight percentages. The melting point (° C.) was determined as follows: LiF—LiCl—$Li_2SO_4$, such as at the following ratios: 25-48-27 at 436.2° C.; 30-48-22 at 433.6° C.; or 35-48-17 at 434.3° C. In one example, LiF can range between 10-50%, LiCl can range between 30-60%, and $LiSO_4$ can range between 15-45%.

The present disclosure provides improved cathode material for use in thermal batteries and batteries including the material. Cathodes in accordance with the present disclosure and batteries containing such cathodes are generally characterized by enhanced conductivity, increased voltage, and/or longer lifetime as compared to conventional cathodes and batteries.

The cathode technology can also include a hybrid cathode of two or more materials of the same type, such as combinations of two or more of the metal fluoride cathode materials described herein. In one aspect, this combination can be $FeF_3$ and/or $FeF_3$+CNT with another material of the same type. The fluoride based cathodes have a higher impedance than their sulfur based cathodes. However, the addition of CNTs into the cathode material can improve the overall impedance of the cathode, but they do not improve energy handling capability. Accordingly, the CNTs can added to the material in small amounts (e.g., less than or about 5%, or 4-6%, or 3-7% or 2-8%).

In one aspect, the hybrid material can provide higher instantaneous power (or current) compared to the individual materials alone. The hybrid material can be a combination of the fluoride and sulfide based cathodes, and thereby include a fluoride and a sulfide. The hybrid can provide an improved combination of energy and power. Examples of the hybrid material can include $FeF_3/FeS_2$, $CoF_3/CoS_2$, and/or $CoF_3/FeS_2$. The ratio of the foregoing materials in the hybrid can be (e.g., $FeF_3/FeS_2$) is in a 50/50 ratio, or 25/75 ratio, or 75/25 ratio, or 20/80 ratio, or 80/20 ratio, or 10/90 ratio, or 90/10 ratio, or any ratio therebetween. In one aspect, the $CoF_3/CoS_2$ can be preferred.

Figure 6:
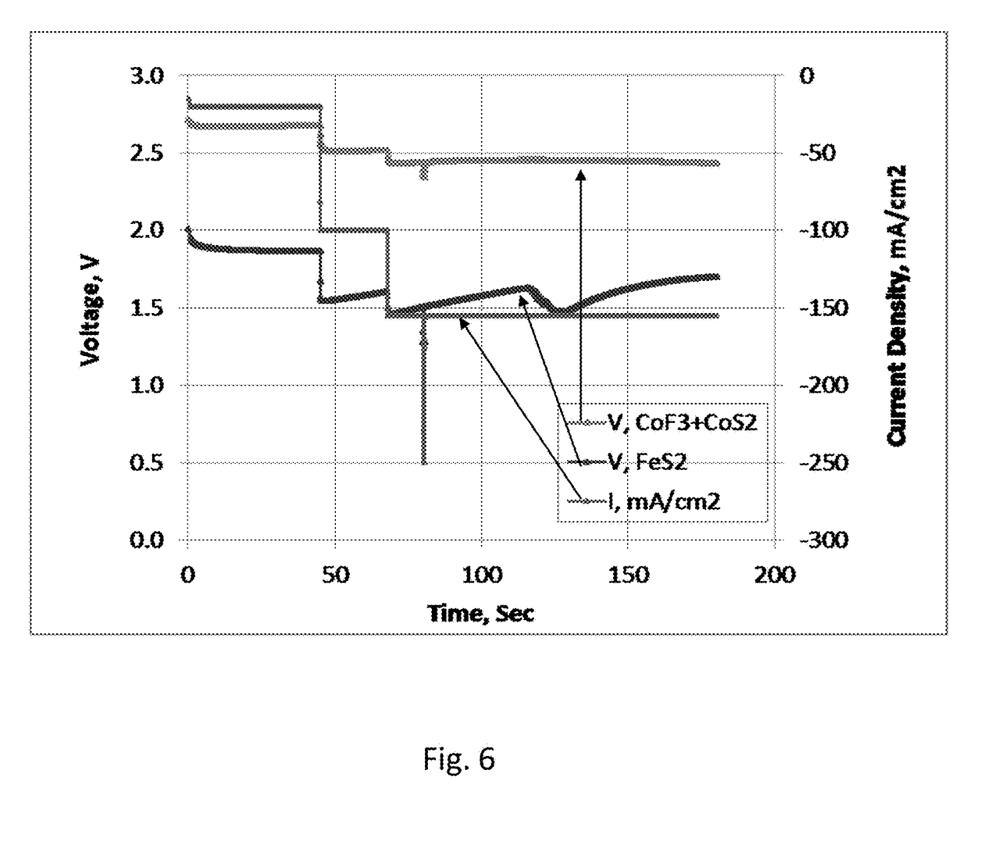
FIG. 6 includes a graph that shows the discharge of $CoF_3$/$CoS_2$ cathodes compared to $FeS_2$ cathodes in a low current pulsed load test.
Figure 7:
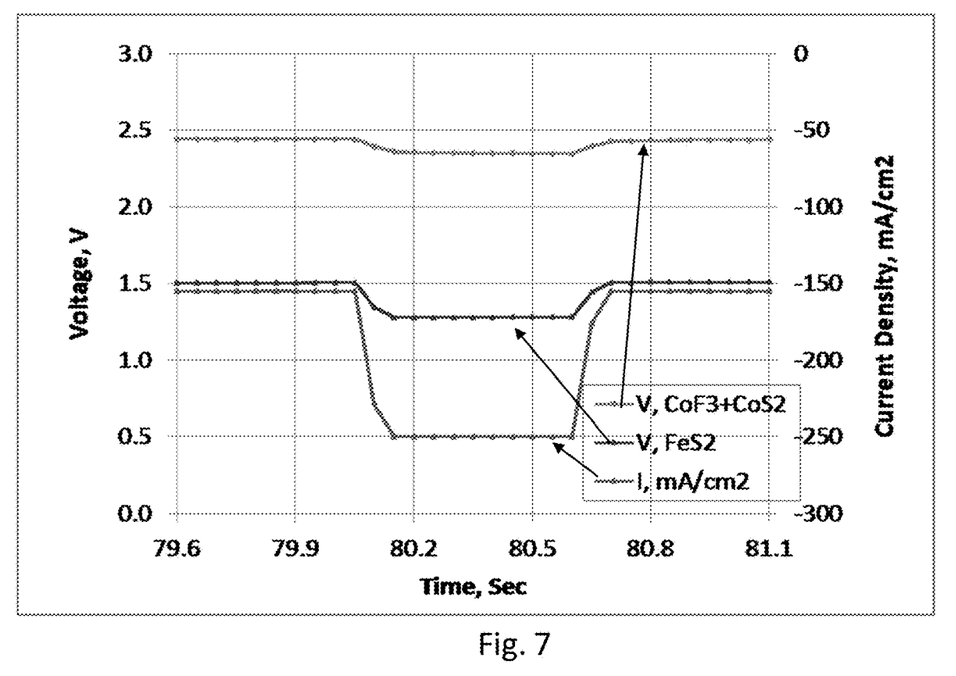
FIG. 7 includes a graph that shows the discharge of $CoF_3$/$CoS_2$ cathodes compared to $FeS_2$ cathodes in a current pulsed load test.

FIG. 6 shows the performance of the hybrid material $CoF_3/CoS_2$ compared to $FeS_2$. The studies were conducted with a current pulsed profile. The discharge voltage of $CoF_3/CoS_2$ cathodes is higher by about 0.8 V to about 1.0 V than that of the $FeS_2$ cathode. FIG. 7 shows the discharge of $CoF_3/CoS_2$ cathodes compared to $FeS_2$ cathodes in the current pulsed load test where the discharge voltage of developed $CoF_3$+$CoS_2$ cathode at 250 mA/cm$^2$ is 1 V higher (e.g., 2.35 V vs. 1.28 V) than that of $FeS_2$ cathode, and where cell impedance of $CoF_3$+$CoS_2$ Cathode is 2.36 times lower than that of $FeS_2$ cathode.

Various refinements exist of the features noted in relation to the above-mentioned aspects of the present disclosure. Additional features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

In one aspect, the thermal batteries can be devoid of one or more of: lithium-silicon alloy powder as anode material; $FeS_2$ as cathode material; or the eutectic electrolyte being LiCl—KCl or halide electrolyte mixture of LiCl—LiF—LiBr. The configurations of the thermal batter so not include the components for a LiSi alloy-$FeS_2$ redox couple.

It should be understood that discussion of the molten electrolyte refers to the potential of the electrolyte to become molten at the temperature ranges provided herein. The electrolyte in the battery is not molten at low temperatures, such as common storage temperatures, and that the electrolyte becomes molten upon reaching the melting temperature. For example, the electrolyte may be a solid that does not flow at a storage temperature or when the heat pellet is not ignited. However, the electrolyte becomes molten and flowable upon reaching the melting temperature, such as when the heat pellet is ignited.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above.

Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety, including: U.S. Pat. Nos. 8,394,520; 8,440,342; and 8,652,674. In these references, the cathode can be substituted for the metal-fluoride cathode described herein, and/or the molten electrolyte be substituted for the molten electrolyte described herein.

The invention claimed is:

1. A thermal battery comprising:
   an anode having a lithium silicon alloy or lithium aluminum;
   a cathode having a metal-fluoride, wherein the metal is V, Cr, Mn, Fe, Co, Ni, Cu, or a combination thereof; and
   an electrolyte composition in contact with the anode and cathode that is capable of becoming molten, the electrolyte composition comprising a tertiary electrolyte being LiF—LiCl—$Li_2SO_4$ that is capable of becoming molten when above a melting point of 350° C.,
   wherein the LiF ranges from 25% to 50%, the LiCl ranges from 30% to 55%, and the $Li_2SO_4$ ranges from 15% to 45%.

2. The thermal battery of claim 1, wherein an amount of the F and Cl halide anions relative to a total amount of negative ions is at least about 20 mol %.

3. The thermal battery of claim 1, wherein the total LiF and LiCl salts and total $Li_2SO_4$ salt has a ratio of LiF and LiCl:$Li_2SO_4$ being from about 0.2:1 to about 2.0:1.

4. The thermal battery of claim 1, the electrolyte composition includes an electrolyte consisting of the LiF—LiCl—$Li_2SO_4$.

5. The thermal battery of claim 1, wherein the electrolyte composition is within one or more of an anode, electrolyte separator, or cathode.

6. The thermal battery of claim 1, comprising a separator region between the cathode and anode that includes the electrolyte composition therein.

7. The thermal battery of claim 6, wherein the separator region includes the electrolyte composition, the electrolyte composition comprising the tertiary electrolyte and an inorganic binder.

8. The thermal battery of claim 7, wherein the inorganic binder is MgO.

9. The thermal battery of claim 1, wherein the metal of the metal-fluoride of the cathode is nickel.

10. The thermal battery of claim 9, wherein the lithium alloy of the anode is lithium silicon.

11. The thermal battery of claim 10, wherein the cathode further includes an electrically conductive material.

12. The thermal battery of claim 11, wherein the conductive material is selected from the group consisting of activated carbon, graphite, graphene, carbon nanotube, and combinations thereof.

13. The thermal battery of claim 1, wherein the electrolyte composition is stable during a discharge with at least a discharge voltage of at least 2.2 V at 100 mA/cm$^2$.

14. A thermal battery comprising:
an anode having a lithium alloy of lithium silicon or lithium aluminum;
a cathode having a metal-fluoride and an electrically conductive material associated with the metal-fluoride, wherein the metal of the metal-fluoride is nickel; and
an electrolyte composition in contact with the anode and cathode that is capable of becoming molten, the electrolyte composition including an electrolyte consisting of LiF—LiCl—Li$_2$SO$_4$ that is capable of becoming molten when above a melting point of 350° C.,
wherein the thermal battery is configured to provide a discharge voltage of at least 2.2 V at 100 mA/cm$^2$,
wherein the LiF ranges from 25% to 50%, the LiCl ranges from 30% to 55%, and the Li$_2$SO$_4$ ranges from 15% to 45%.

15. A method of providing electricity comprising:
providing an electronic device having a thermal battery of claim 1, wherein the electrolyte composition is at a temperature so as to be a molten electrolyte; and
discharging the thermal battery to provide at least 2.2 V of electricity without degrading the electrolyte.

16. A method of providing electricity comprising:
providing an electronic device having a thermal battery of claim 4, wherein the electrolyte composition is at a temperature so as to be a molten electrolyte; and
discharging the thermal battery to provide at least 2.2 V of electricity without degrading the electrolyte.

17. A method of providing electricity comprising:
providing an electronic device having a thermal battery of claim 10, wherein the electrolyte composition is devoid of Br and is at a temperature so as to be a molten electrolyte; and
discharging the thermal battery to provide at least 2.2 V of electricity without degrading the electrolyte.

18. The method of claim 17, comprising discharging the thermal battery to provide at least or about 3 V of electricity without degrading the electrolyte.

19. The method of claim 17, wherein the cathode further includes an electrically conductive material.

20. The method of claim 17, discharging the thermal battery to provide at least 2.5 V of electricity with a current density of 0.1-1 A/cm$^2$ without degrading the electrolyte.

* * * * *